Dec. 22, 1953   G. T. FIELDING   2,663,577
LOOSE-LEAF BOOK CONSTRUCTION
Filed Jan. 2, 1951   2 Sheets-Sheet 1
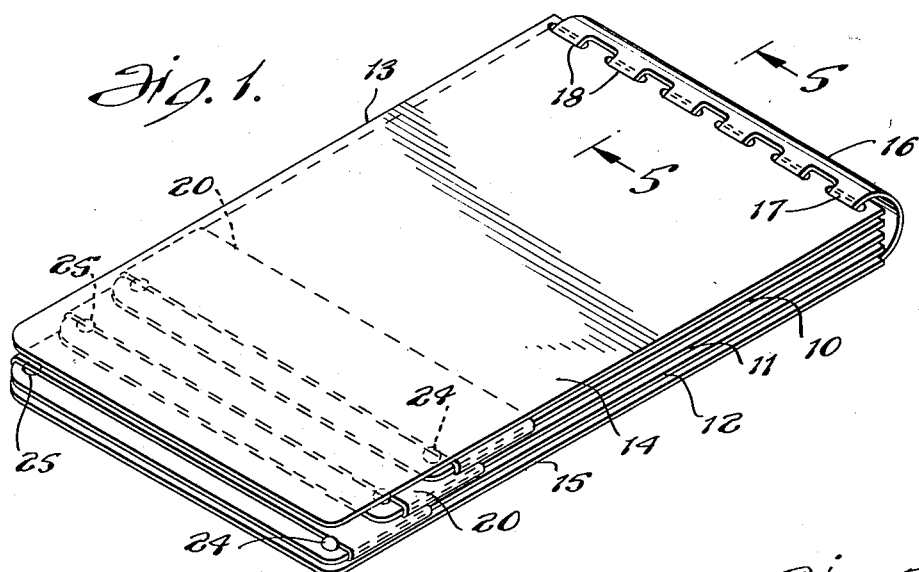
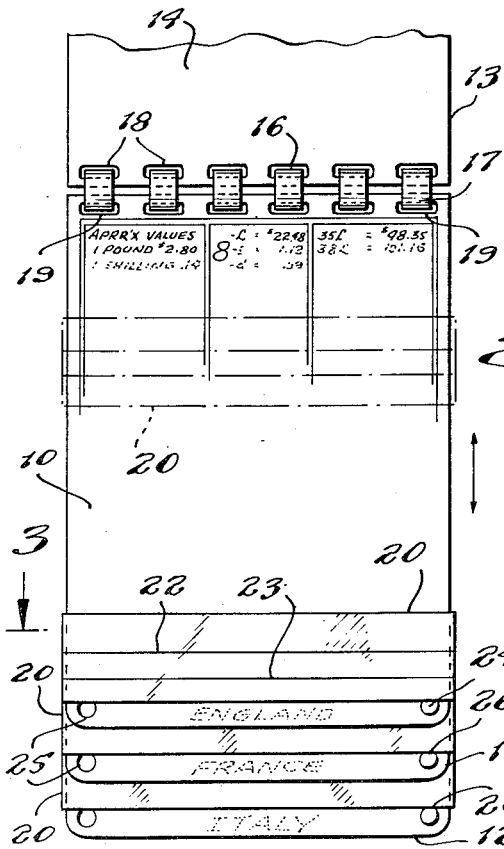
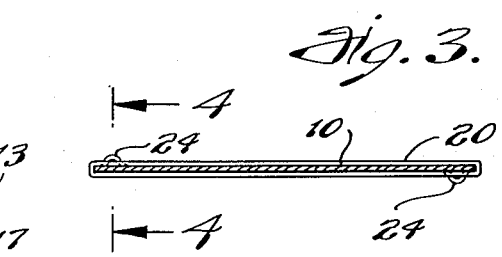
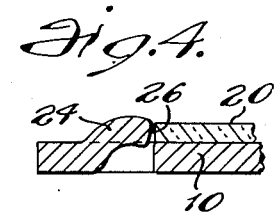
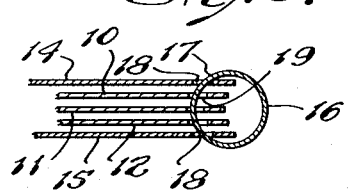
INVENTOR.
GEORGE T. FIELDING
BY
Clark & Ott
ATTORNEYS Dec. 22, 1953 G. T. FIELDING 2,663,577
LOOSE-LEAF BOOK CONSTRUCTION
Filed Jan. 2, 1951 2 Sheets-Sheet 2

INVENTOR.
GEORGE T. FIELDING
BY
Clark & Ott
ATTORNEYS

Patented Dec. 22, 1953

2,663,577

UNITED STATES PATENT OFFICE 2,663,577

LOOSE-LEAF BOOK CONSTRUCTION

George T. Fielding, Stamford, Conn.

Application January 2, 1951, Serial No. 203,960

1 Claim. (Cl. 281—15)

This invention relates to book constructions and has particular reference to a loose-leaf book construction composed of substantially stiff leaves for use as a convenient reference book and which can be carried in the pocket without bending or distortion of the leaves thereof.

The invention has in view a loose-leaf book construction of said character having slides in the form of bands which engage peripherally about the leaves respectively and are mounted thereon for limited movement over the opposite faces of the leaves for facilitating reading or scanning of the lines of reading matter thereon.

Still another object of the invention is to provide stop means adjacent the outer free edges of the leaves respectively for limiting the movement of the slides.

Still another object of the invention is to provide a book construction of said character in which the leaves successively increase in length and are retained in normally spaced relation by means of outstruck portions of the body thereof which also form the stops for limiting the movement of the slides.

The invention also resides in another of its forms in the provision of a book construction including a loose-leaf holder of transparent material through which the loose-leaves may be viewed and with a slide engaging about the front wall of the holder adapted to be moved to various positions thereon for facilitating reading of the lines of reading matter on the pages.

With the foregoing and other objects in view, reference is now made to the following specification and accompanying drawings in which the preferred embodiments of the invention are illustrated.

In the drawings:

Fig. 1 is a perspective view of a loose-leaf book construction embodying the invention.

Fig. 2 is a plan view thereof with the front cover disposed in open relation.

Fig. 3 is a sectional view through one of the leaves taken approximately on line 3—3 of Fig. 2.

Fig. 4 is an enlarged fragmentary sectional view taken approximately on line 4—4 of Fig. 3.

Fig. 5 is an enlarged fragmentary sectional view taken approximately on line 5—5 of Fig. 1.

Figure 6:
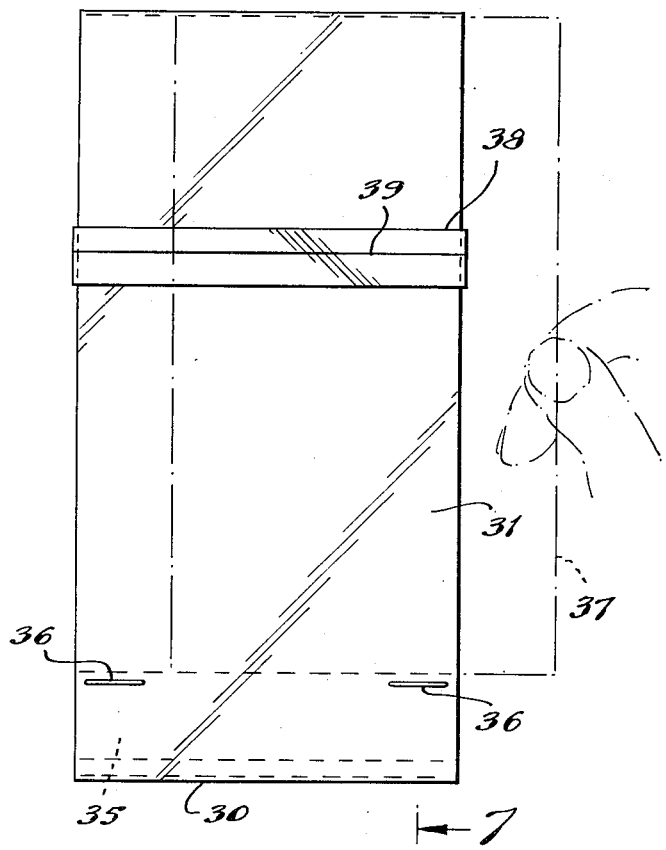
Fig. 6 is a front view of a modified form of loose-leaf book construction embodying the invention.

Referring to the drawings by characters of reference, and more particularly to the form of the invention illustrated in Figures 1 to 5 thereof, the loose-leaf book construction is shown with three loose-leaves 10, 11 and 12 for illustration purposes which are contained within a stiff backing 13 consisting of front and rear walls 14 and 15 and a tubular binder 16 having longitudinally spaced terminals 17 engaging through openings 18 in the front and rear walls and through openings 19 in the leaves. The leaves may be of any desired number and preferably increase in length successively from the uppermost leaf to the bottom-most leaf.

In order to facilitate reading or scanning of the printed matter on the opposite sides of the leaves, a transparent slide 20 is provided which is in the form of an endless band extending transversely across the front and rear faces of the leaves respectively and around the side edges thereof. The said slides are readily slidable on the leaves for disposing the same in any desired position thereon with one or more guide lines extending transversely thereacross, such as the guide lines 22 and 23 for disposing the same above and below the lines of printed matter on the front and rear faces of the leaves whereby the line of reading matter above any one of the lines or between the lines may be more conveniently read. The slides are movable throughout the length of the leaves and in order to prevent relative separation thereof, the leaves are each formed with outstruck lugs 24 and 25, the lug 24 being struck upwardly above the face of the leaf, while the lug 25 is struck downwardly from the face of the leaf to constitute stops for engagement by the opposite sides of the slide to limit the downward movement thereof towards the free end of the leaves. As illustrated, the lugs 24 and 25 are provided with a transverse edge 26 against which the slide 20 abuts, as shown in detail in Fig. 4 of the drawings.

The loose-leaf book construction is primarily adapted for use as a currency guide with foreign currency listed in one column in different denominational amounts and the corresponding United States value thereof listed in another column, as shown in Fig. 2 of the drawings. The leaves are preferably of stiff material, while the slides 20 are of transparent material so that the reading matter on the leaves is visible therethrough. The leaves as well as the slides are preferably made from a cellulose derivative product, phenol formaldehyde resin or equivalent material.

Figure 7:
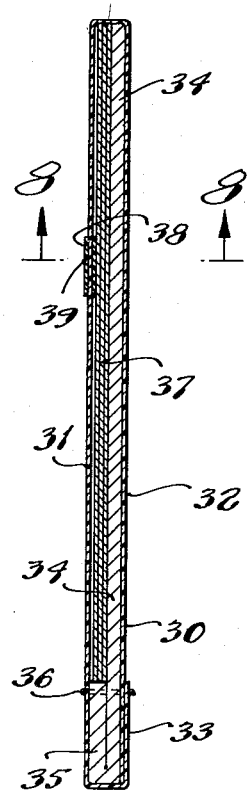
Fig. 7 is a longitudinal sectional view taken approximately on line 7—7 of Fig. 6.
Figure 8:
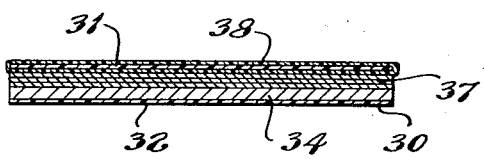
Fig. 8 is a transverse sectional view taken approximately on line 8—8 of Fig. 7.

In the form of the invention illustrated in Figs. 6 to 8 inclusive of the drawings, the loose-leaf book construction includes a holder 30 which consists of a sheet of transparent material doubled to provide front and rear walls 31 and 32 with the end 33 of said sheet extending over the rear face of the rear wall 32 along the bottom thereof to form a longitudinally extending pocket between the front and rear walls. A backing 34 is provided of cardboard and the like which extends longitudinally of the pocket between the front and rear walls 31 and 32 with the lower end thereof doubled over along the bottom to provide a two ply lower edge portion 35. The backing 34 is secured in position between the said walls by stitching such as the metal stitching 36 which extends through the front and rear walls 31 and 32 and the backing 34 with the stitching clinched over against the rear face of the end 33. Any desired number of leaves 37 may be arranged in the holder between the front wall 31 and the backing 34 which extend from the upper end of the holder to the upper edge of the lower portion 35 of the backing 34.

In order to facilitate reading or scanning of the printed matter on the leaves, a transparent slide 38 is provided which is in the form of an endless band extending transversely across the front and rear face of the front wall 31 of the holder and around the side edges thereof. The said slide is readily slidable on the front wall 31 for disposing the same in any desired position thereon, and the same is provided with one or more guide lines extending transversely thereacross, such as the guide line 39 for disposing the same above or below a line of printed matter on the leaves, whereby the line of printed matter may be conveniently read. The said slide is movable throughout the length of the sheet from the upper end thereof to the lower end 35 of the backing.

What is claimed is:

In a device of the character described, a binder, a plurality of relatively stiff leaves hingedly connected with said binder along their upper edges, each of said leaves below the top leaf being longer than the adjacent overlying leaf, a transparent slide consisting of a band extending about each leaf and slidably fitting the same for disposing the slide in various positions thereon in spaced relation from the hinged edge thereof, said slides each having a guide line extending transversely thereacross on opposite sides thereof for facilitating reading of the matter on opposite sides of the leaf, said leaves having parallel opposite side edges throughout their length about which the said slides engage, and said leaves each having a lug struck from the body adjacent the free end thereof and within the confines of the adjacent overlying leaf constituting a stop for limiting the movement of the slide and for retaining the slide on the leaf and for spacing each leaf from the adjacent leaf for facilitating grasping of the leaf and movement of the slide.

GEORGE T. FIELDING.

References Cited in the file of this patent

UNITED STATES PATENTS

| Number | Name | Date |
|---|---|---|
| 212,772 | Wakeman | Feb. 25, 1879 |
| 403,113 | Keller | May 14, 1889 |
| 1,363,120 | Johnson | Dec. 21, 1920 |
| 1,577,799 | Foot | Mar. 23, 1926 |
| 1,658,499 | Stevens | Feb. 7, 1928 |
| 2,057,807 | Whitmore | Oct. 20, 1936 |
| 2,272,858 | Werkheiser | Feb. 10, 1942 |
| 2,506,456 | Jackson | May 2, 1950 |
| 2,530,702 | Johnson | Nov. 21, 1950 |